US010457468B2

(12) United States Patent
Michaels et al.

(10) Patent No.: US 10,457,468 B2
(45) Date of Patent: Oct. 29, 2019

(54) THERMALLY PROTECTED SHIPPING CONTAINER

(71) Applicant: Call2Recycle, Inc., Atlanta, GA (US)

(72) Inventors: Timothy R. Michaels, Roswell, GA (US); Brian K. Hoggard, Marietta, GA (US)

(73) Assignee: Call2Recycle, Inc., Atlanta, GA (US)

( * ) Notice: Subject to any disclaimer, the term of this patent is extended or adjusted under 35 U.S.C. 154(b) by 0 days.

(21) Appl. No.: 16/130,326

(22) Filed: Sep. 13, 2018

(65) Prior Publication Data

US 2019/0092553 A1  Mar. 28, 2019

Related U.S. Application Data

(60) Provisional application No. 62/562,883, filed on Sep. 25, 2017.

(51) Int. Cl.
*B65D 81/38* (2006.01)
*B65D 65/10* (2006.01)
*B65D 5/02* (2006.01)
*H01M 2/10* (2006.01)

(52) U.S. Cl.
CPC ......... *B65D 81/386* (2013.01); *B65D 5/0254* (2013.01); *B65D 65/10* (2013.01); *B65D 2585/88* (2013.01); *H01M 2/1094* (2013.01)

(58) Field of Classification Search
CPC .......... B65D 5/0095; B65D 5/00; B65D 5/42; B65D 5/4266; B65D 5/56; B65D 5/563; B65D 2519/0086; B65D 2585/88
See application file for complete search history.

(56) References Cited

U.S. PATENT DOCUMENTS

| 2,502,561 | A | | 4/1950 | Ebert |
| 3,934,066 | A | * | 1/1976 | Murch ............... E04B 1/94 442/221 |
| 4,398,902 | A | | 8/1983 | Mangum |
| 4,431,128 | A | | 2/1984 | Dirico |
| 5,894,933 | A | | 4/1999 | Crews et al. |

(Continued)

FOREIGN PATENT DOCUMENTS

EP   0531581   3/1993

OTHER PUBLICATIONS

International Search Report and Written Opinion for PCT/US2018/050854, dated Nov. 8, 2018.

*Primary Examiner* — Corey N Skurdal
(74) *Attorney, Agent, or Firm* — Wiley Rein LLP (57) ABSTRACT

A container for storage and shipping of objects includes a lid assembly having two configurations and an open-top box. In the first configuration the container can be loaded with objects for storage or collection while limiting physical and visual access to the contents of the box and in the second configuration, the container is sealed for shipping. The lid assembly contains side flaps which may be used to stabilize the lid assembly in the first configuration, and in the second configuration, secure the lid assembly to the open-top box. Preferably, the container is formed from one contiguous blank. The blank is preferably made of corrugated cardboard but may be formed from any substantially rigid material. The container is thermally protected with a flame-retardant treatment, such as a thermally protective lining.

13 Claims, 8 Drawing Sheets

(56) References Cited

U.S. PATENT DOCUMENTS

| | | | |
|---|---|---|---|
| 8,579,183 B2 | 11/2013 | Belfort et al. | |
| 9,631,773 B2 | 4/2017 | Gehlhausen et al. | |
| 2004/0211782 A1* | 10/2004 | Howe | B65D 77/065 |
| | | | 220/495.06 |
| 2012/0031920 A1* | 2/2012 | Belfort | B65D 5/6614 |
| | | | 220/810 |
| 2013/0192166 A1* | 8/2013 | Olsson | D21H 19/36 |
| | | | 53/428 |

* cited by examiner

THERMALLY PROTECTED SHIPPING CONTAINER

CROSS-REFERENCE TO RELATED APPLICATIONS

This application claims the benefit of U.S. provisional application No. 62/562,883, filed 25 Sep. 2017, now pending, which is hereby incorporated by reference in its entirety as though fully set forth herein.

BACKGROUND

The instant disclosure generally relates to containers for collection, storage, and/or shipping of objects, such as batteries. In particular, the present disclosure relates to a container that, when folded into a first configuration, can be loaded with objects, and, when folded into a second configuration, is securely sealed to allow for shipment of those objects.

Rechargeable batteries often contain by-products, including corrosive acids and heavy metals, that are harmful to the environment if not properly disposed. Thus, the recycling of these batteries is highly desirable. Recycling, however, is not easy for individual consumers because facilities equipped to recycle these products are often far away, requiring the products to be shipped to the recycling facilities. Furthermore, Department of Transportation regulations governing the transportation of rechargeable batteries make it onerous for individuals to ship a single battery to a recycling center.

It is much more economical to collect rechargeable batteries at a local collection point and ship them to recycling facilities in large quantities. As a result, Call2Recycle, Inc. ("Call2Recycle") has established an infrastructure for the collection of rechargeable batteries, partnering with many businesses as collection points. Consumers can drop off used rechargeable batteries at these collection points and the businesses can ship the batteries to recycling centers in large quantities in compliance with Department of Transportation regulations.

The contents of traditional boxes, however, are readily viewable and easily accessible when the box is open for collecting. Such boxes, when left open, can also be unsightly and undesirable for retail stores serving as collection points. Furthermore, these boxes require tape or adhesive to assemble for collection and to seal for shipping.

BRIEF SUMMARY

In order to encourage such recycling, it is desirable to provide a convenient method of collecting and shipping rechargeable batteries. A container according to the present teachings can advantageously receive various objects while limiting physical and visual access to the contents of the box and can very easily be reconfigured for shipping in compliance with Department of Transportation regulations when the box is full. These advantages make it particularly desirable for collecting and shipping rechargeable batteries by businesses partnering with Call2Recycle. It should be understood, of course, that the present disclosure is not limited to use with rechargeable batteries, and may be practiced to good advantage with other items as well.

Disclosed herein is a container that can be configured to receive and store various objects, and then reconfigured to seal the container to allow for shipping. The container generally includes an open-top box portion and a lid assembly portion attached to the open-top box portion. The lid assembly includes two side flaps which form the sides of the lid assembly in one configuration and, in another configuration, secure the lid assembly to the open-top box so as to seal the opening of the box.

According to an aspect of the disclosure, the container includes an open-top box and a lid assembly. The open-top box includes a top flap attached to the upper edge of the open-top box along a fold line that can partially cover the open top. The lid assembly includes a back panel that is attached to the upper edge of the open-top box along a fold line opposite the top flap. The lid assembly further includes a front panel with an opening attached to the back panel. The front panel can be directly attached to the back panel along a fold line. Furthermore, the front panel may be attached to the back panel via a top panel that is attached to the front panel along a fold line and attached to the back panel along another fold line. Optionally, the front panel of the lid assembly further includes a door configured to substantially close the opening. The lid assembly further includes a pair of side flaps that may be attached to either the back panel or the front panel along fold lines. Preferably, the open-top box and the lid assembly of the present invention are formed from one contiguous, foldable sheet (or "blank") made from a substantially rigid material, such as corrugated cardboard. One of ordinary skill in the art, however, would appreciate that the present invention can be made of any substantially rigid material suitable for shipping and is not limited to corrugated cardboard.

In the first configuration, the side flaps couple the front and back panels together such that the front and back panels form the front and back of the lid assembly and the side panels form the side closures to the lid assembly and stabilize the lid assembly. For example, side flaps attached to the front panel may have tabs that lock into corresponding notches in the back panel. Once stabilized, the front panel is coupled to the top flap of the open-top box such that the lid assembly and the top flap substantially close the open top, and the opening in the front panel provides access to the box. In the second configuration, the side flaps are secured to the sides of the open-top box such that the lid assembly forms the top of the box and seals the container for shipment.

In another embodiment, the apparatus comprises a lid assembly for use with an open-top box. The lid assembly includes a coupling panel capable of being attached to the side of an open-top box of similar dimensions. The lid assembly also includes a back panel attached to the coupling panel along a fold line. The lid assembly further includes a front panel with an opening attached to the back panel. The front panel can be directly attached to the back panel along a fold line. Furthermore, the front panel may be attached to the back panel via a top panel that is attached to the front panel along a fold line and attached to the back panel along another fold line. Optionally, the front panel of the lid assembly further includes a door configured to substantially close the opening. The lid assembly further includes a pair of side flaps that may be attached to either the back panel or the front panel along fold lines.

In the first configuration, the side flaps couple the front and back panels together such that the front and back panels form the front and back of the lid assembly and the side panels form the side closures to the lid assembly and stabilize the lid assembly. For example, side flaps attached to the front panel may have tabs that lock into corresponding notches in the back panel. Once stabilized, the front panel is coupled to the open-top box such that the lid assembly substantially closes the open top, and the opening in the front panel provides access to the box. In the second configuration, the side flaps are secured to the sides of the open-top box such that the lid assembly forms the top of the box and seals the container for shipment.

Yet another embodiment is a blank made from a substantially rigid material capable of folding into a container including an open-top box and a lid assembly. The invention according to this aspect includes a first set of foldable panels that are configured to fold into an open-top box having an upper edge and including a top flap attached to the upper edge along a fold line. The invention further includes a second set of foldable panels attached to the first set of foldable panels. The second set of foldable panels are configured to form a lid assembly attached to the upper edge of the open-top box along a fold line. When the second set of panels is configured into lid assembly form, the lid assembly includes a back panel that is attached to the upper edge of the open-top box along a fold line opposite the top flap. The lid assembly further includes a front panel with an opening attached to the back panel. The front panel can be directly attached to the back panel along a fold line. Furthermore, the front panel may be attached to the back panel via a top panel that is attached to the front panel along a fold line and attached to the back panel along another fold line. Optionally, the front panel of the lid assembly further includes a door configured to substantially close the opening. The lid assembly further includes a pair of side flaps that may be attached to either the back panel or the front panel along fold lines.

When the first set of panels is configured into an open-top box form and the second set of panels is configured into a lid assembly form, the side flaps can couple the front and back panels together such that the front and back panels form the front and sides of the lid assembly and the side panels form the side closures to the lid assembly and stabilize the lid assembly. For example, side flaps attached to the front panel may have tabs that lock into corresponding notches in the back panel. Furthermore, the front panel can be coupled to the top flap of the open-top box such that the lid assembly and the top flap substantially close the open top, and the opening in the front panel provides access to the box. Alternatively, the side flaps can be secured to the sides of the open-top box such that the lid assembly forms the top of the box and seals the container for shipment.

An advantage of the disclosure is that it simplifies the collection and shipping of various objects. More specifically, it simplifies the collection and shipping of rechargeable batteries, cellular phones, and other objects that are subject to Department of Transportation shipping regulations. The present invention, however, is not limited to these specific objects as one of ordinary skill in the art would appreciate that the present invention simplifies the collection and shipping of any object.

The foregoing and other aspects, features, details, utilities, and advantages of the present disclosure will be apparent from reading the following description and claims, and from reviewing the accompanying drawings.

DETAILED DESCRIPTION

Figure 1:
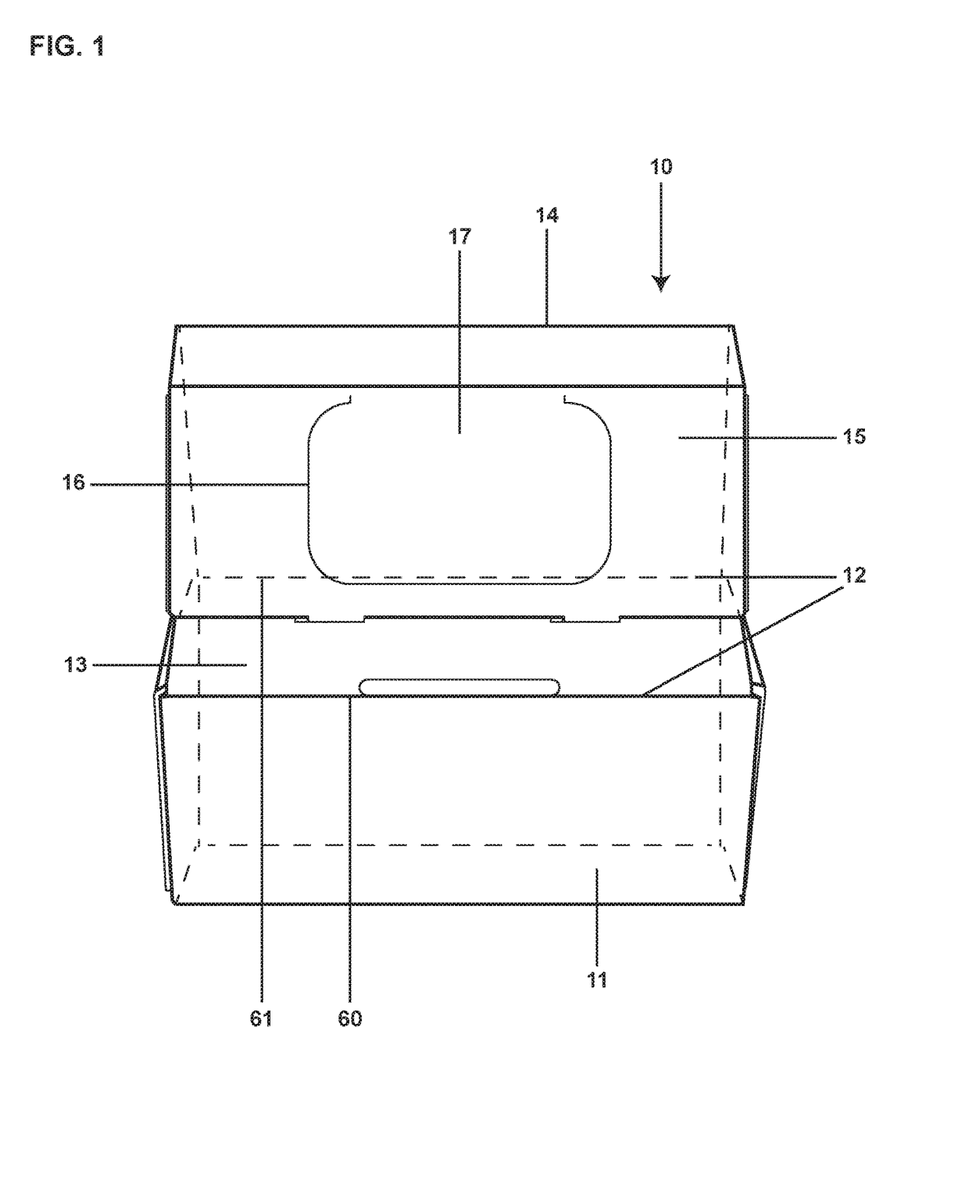
FIG. 1 is a front view of an assembled container in the first configuration.

FIG. 1 illustrates a container 10 according to one embodiment of the instant disclosure, assembled in the first configuration, as viewed from the front of container 10. The container 10 includes an open-top box portion 11 having an upper edge 12 (the rear portion of which is shown in phantom) and including a top flap 13 which is attached to the upper edge 12 along a fold line 60. It should be understood that, as used herein, the term "attached" is not limited to the joining of separate pieces. Indeed, the term "attached" as used herein encompasses components that are integrally formed, such as from a single blank, and demarcated or otherwise separated by a perforation, fold line (including perforated fold lines), or the like.

Container 10 further includes a lid assembly 14, which is attached to the upper edge 12 of the open-top box portion 11 along a fold line 61. Fold lines 60 and 61 partially define upper edge 12 of the open top box portion 11. FIG. 1 further depicts front panel 15, which includes an opening 16. FIG. 1 depicts an optional door 17, which substantially covers the opening 16.

Figure 3:
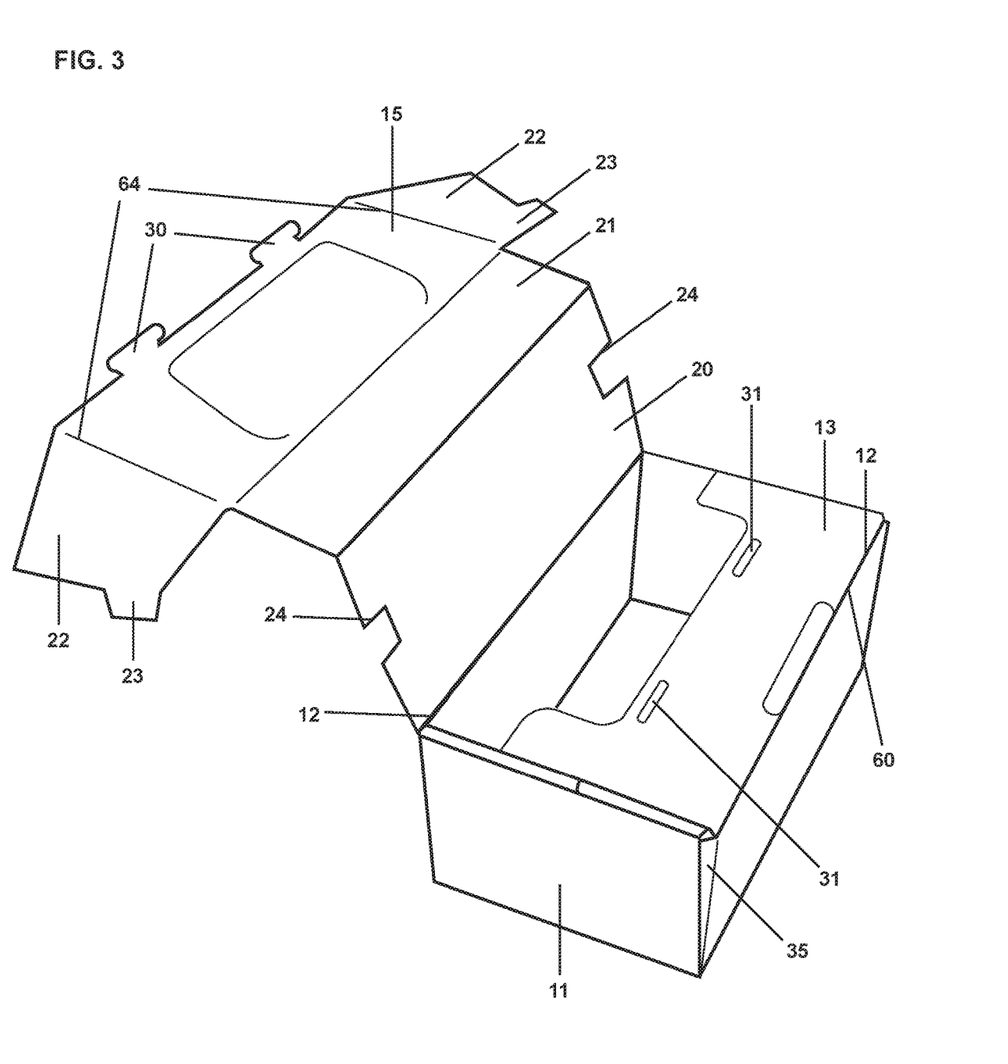
FIG. 3 is an isometric view of the front of a partially unassembled container.

The open-top box portion 11 is a box as understood by one of ordinary skill in the art. As shown in FIG. 3, the open-top box portion 11 has a bottom and four sides. The top of the open-top box portion 11 is open. The top flap 13 is attached to the upper edge 12 along a fold line 60. As seen in FIG. 3, the top flap 13 can be folded such that top flap 13 at least partially covers the top of the open-top box portion 11. One of ordinary skill in the art will readily appreciate the construction of open-top box portion 11, such that further description herein is not necessary.

Figure 2:
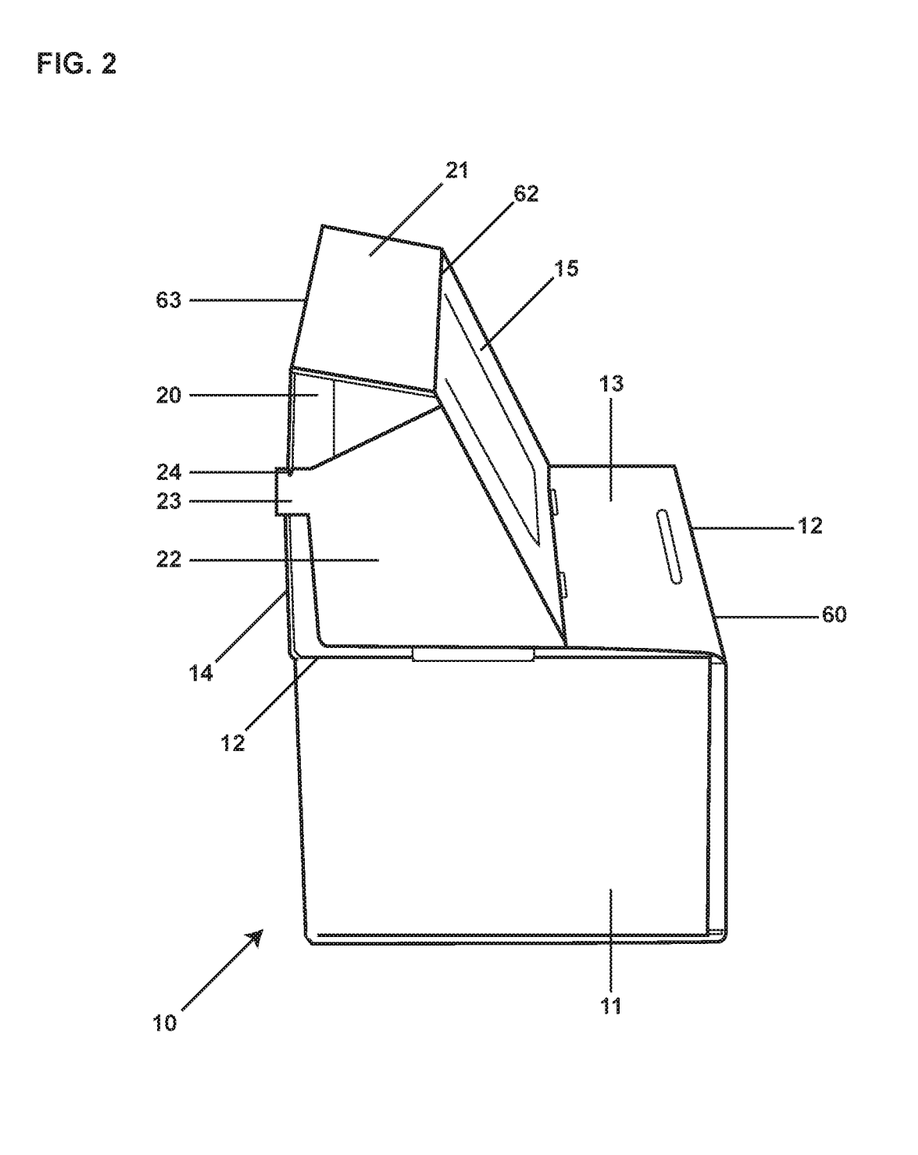
FIG. 2 is an isometric view of the front of an assembled container in the first configuration.

As shown in FIG. 2, the lid assembly 14 includes a back panel 20 and a front panel 15 attached to the back panel 20 via an optional top panel 21. In the depicted embodiment, the top panel 21 is attached to both the front panel 15 and the back panel 20 along fold lines 62 and 63, respectively. It should be understood, however, that top panel 21 is not necessary. That is, though FIG. 2 depicts back panel 20 and front panel 15 interconnected via top panel 21, it is contemplated that, according to aspects of the disclosure, back panel 20 can be directly connected to front panel 15 along a fold line (e.g., without intervening top panel 21).

As illustrated in FIGS. 2 and 3, a pair of side flaps 22 are attached to the front panel 15 along fold lines 64. In the first configuration, the tabs 23 on the side flaps 22 slide into the notches 24 in the back panel 20 as seen in FIG. 2. The notches 24 are configured such that the tabs 23 can be securely locked into the notches 24. In this configuration, the side flaps 22 form the side closures to the lid assembly 14. Alternatively, the side flaps 22 can be attached to the back panel 20, while the notches 24 may be placed on the front panel 15. The tabs 23 of the side flaps 22 could still be configured to lock into notches 24 such that the side flaps 22 form the side closures of the lid assembly 14. Once the tabs 23 are locked into notches 24, the front panel 15 and back panel 20 are coupled together and the lid assembly 14 is stabilized.

It should be understood that the tab and notch assembly is not the only contemplated approach to forming side closures with the side flaps 22. One of ordinary skill in the art would recognize that any approach to securing the side flaps 22 to the back panel 20 (if side flaps 22 are attached to the front panel 15 along fold lines), or alternatively to the front panel 15 (if side flaps 22 are attached to the back panel 20 along fold lines) can suffice to form side closures for the lid assembly 14.

FIG. 3 further illustrates sliding tabs 30 and top flap slots 31 that allow the lid assembly 14 to be coupled to the top flap 13. Once the lid assembly 14 is formed by securing the side flaps as described above, the sliding tabs 30 can be placed in corresponding top flap slots 31, thus coupling the lid assembly 14 to the top flap 13 as illustrated in FIG. 2. Again, it is to be understood that any approach to coupling the lid assembly to the top flap may be used, without limitation to the sliding tab and slot assembly particularly illustrated in FIGS. 2 and 3.

When in the first configuration, as shown in FIGS. 1-2, various objects (e.g., rechargeable batteries) can be placed in the container through the opening 16. A door 17 can substantially cover the opening 16, further limiting visual access to the contents of the container. When the container is full, the lid assembly can be disassembled as shown in FIG. 3. and then reconfigured in the second configuration as described below for shipment of the container.

Figure 4A:
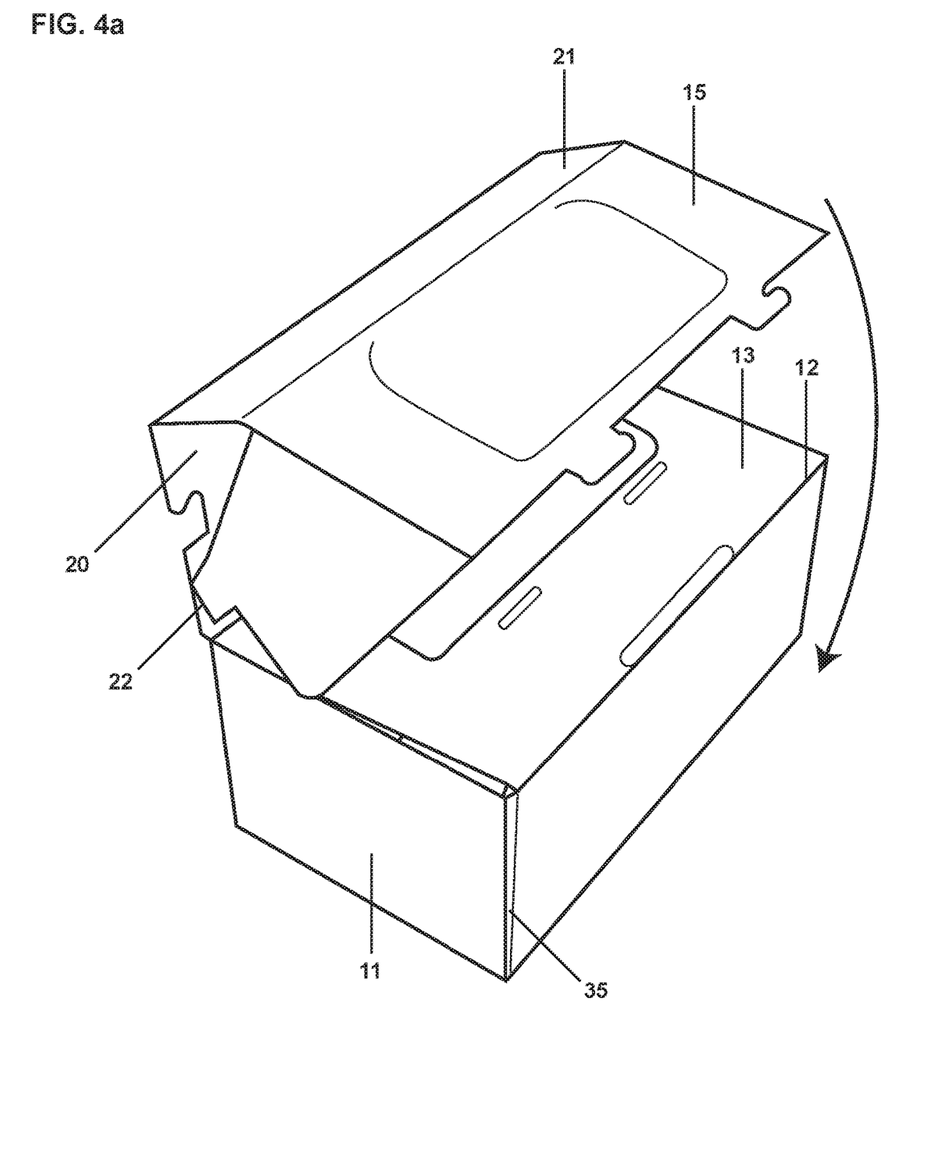
FIG. 4a is an isometric view of the front of a container being converted into the second configuration.
Figure 4B:
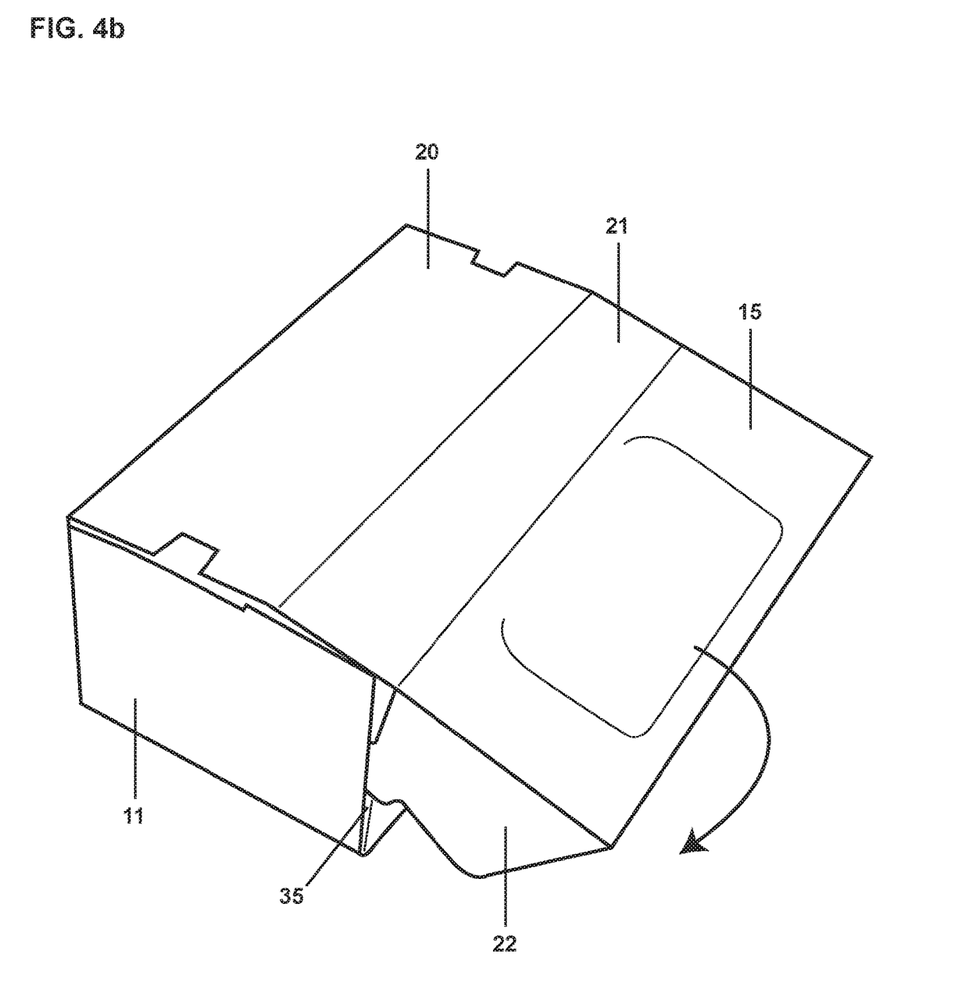
FIG. 4b is an isometric view of the front of a container being converted into the second configuration.
Figure 4C:
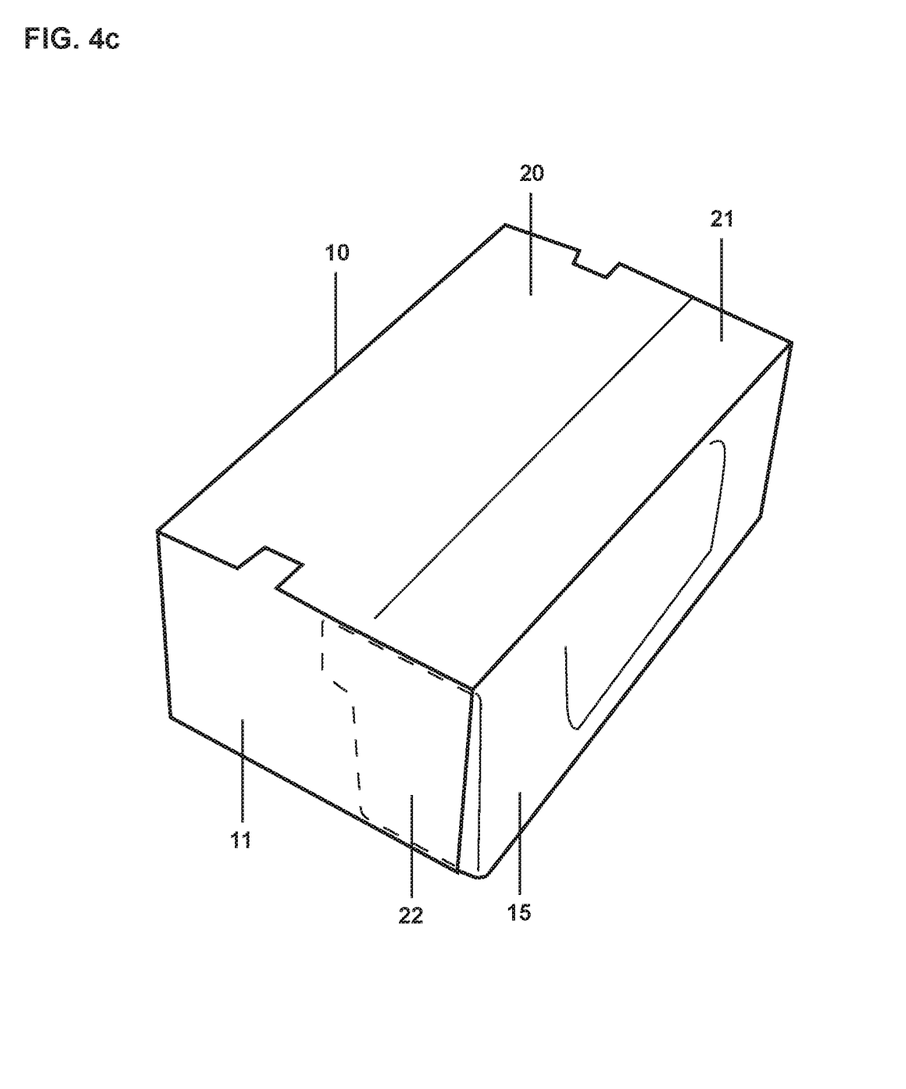
FIG. 4c is an isometric view of the front of an assembled container in the second configuration.

The reconfiguration of the lid assembly for shipment of the container will be described with reference to FIGS. 4a-4c. The lid assembly 14 is brought downwards, towards the open-top box portion 11 such that the back panel 20 lays flat against the top of the open-top box 11 as shown in FIGS. 4b-4c. In embodiments with top panel 21, the top panel 21 also lays flat against the top of the open-top box portion 11 as shown in FIGS. 4b-4c. In embodiments without a top panel 21 (not shown), it is contemplated that the back panel 20 covers the entire top of the open-top box portion 11. Thus, the back panel 20 and optionally, the top panel 21, cover the opening of the open-top box portion 11, forming a top to the open-top box portion 11. The side flaps 22 may then be secured to the sides of the open-top box portion 11 by packaging tape, adhesive, pre-applied adhesive, or other methods that will be familiar to those of ordinary skill in the art. Preferably, the side flaps 22 tuck into slots 35 in the front of the open-top box portion 11. As seen in FIG. 4c, once the side flaps 22 are secured in slots 35, the container 10 is sealed and ready for shipment.

Figure 5:
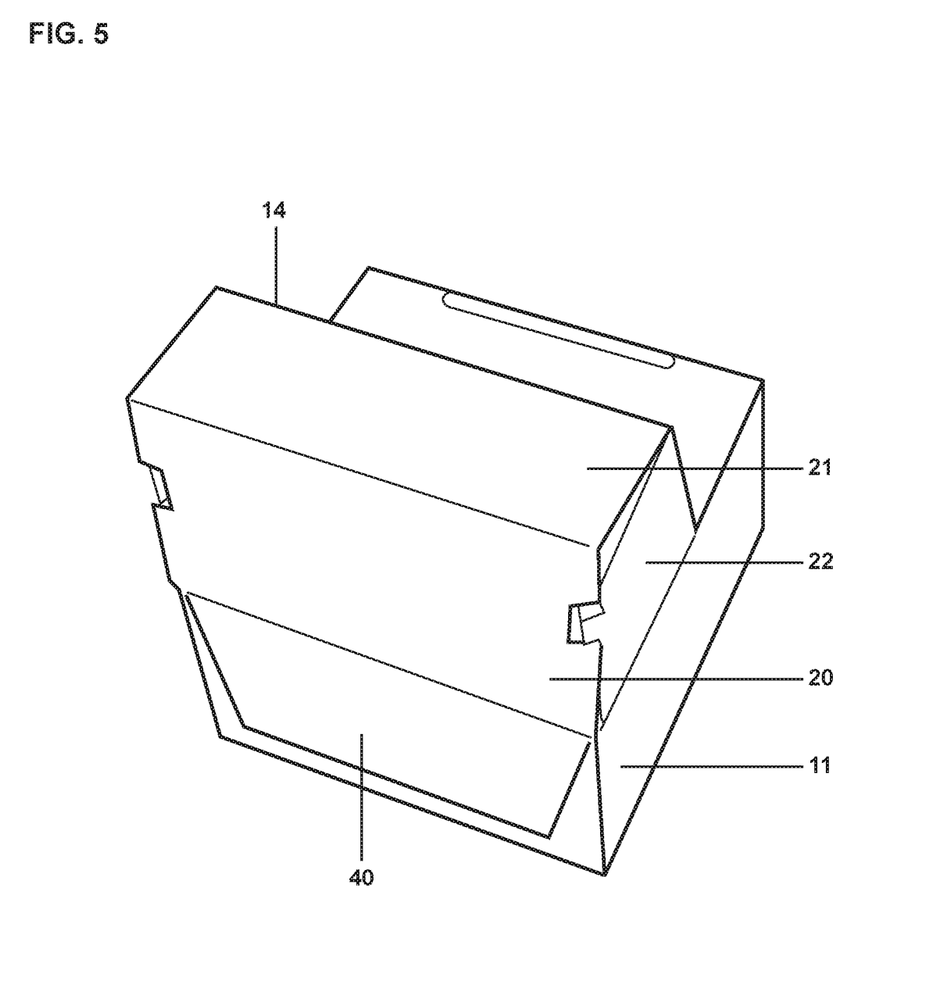
FIG. 5 is an isometric view of the back of a partially unassembled container.

It is also contemplated that the lid assembly 14 described above may be coupled to any open-top box structure. Referring now to FIG. 5, another embodiment of the lid assembly 14 is shown. The lid assembly 14 includes a coupling panel 40 which is used to attach the lid assembly to any open-top box 11. Various well-known methods, including tape, adhesive, and pre-applied adhesive, may be used to attach the coupling panel 40 to the open-top box 11. As described above, the lid assembly 14 can be placed in a first configuration suitable for receiving and storing various objects in the open-top box 11, or in a second configuration in which the open-top box is sealed by the lid assembly 14 and suitable for shipment.

Figure 6:
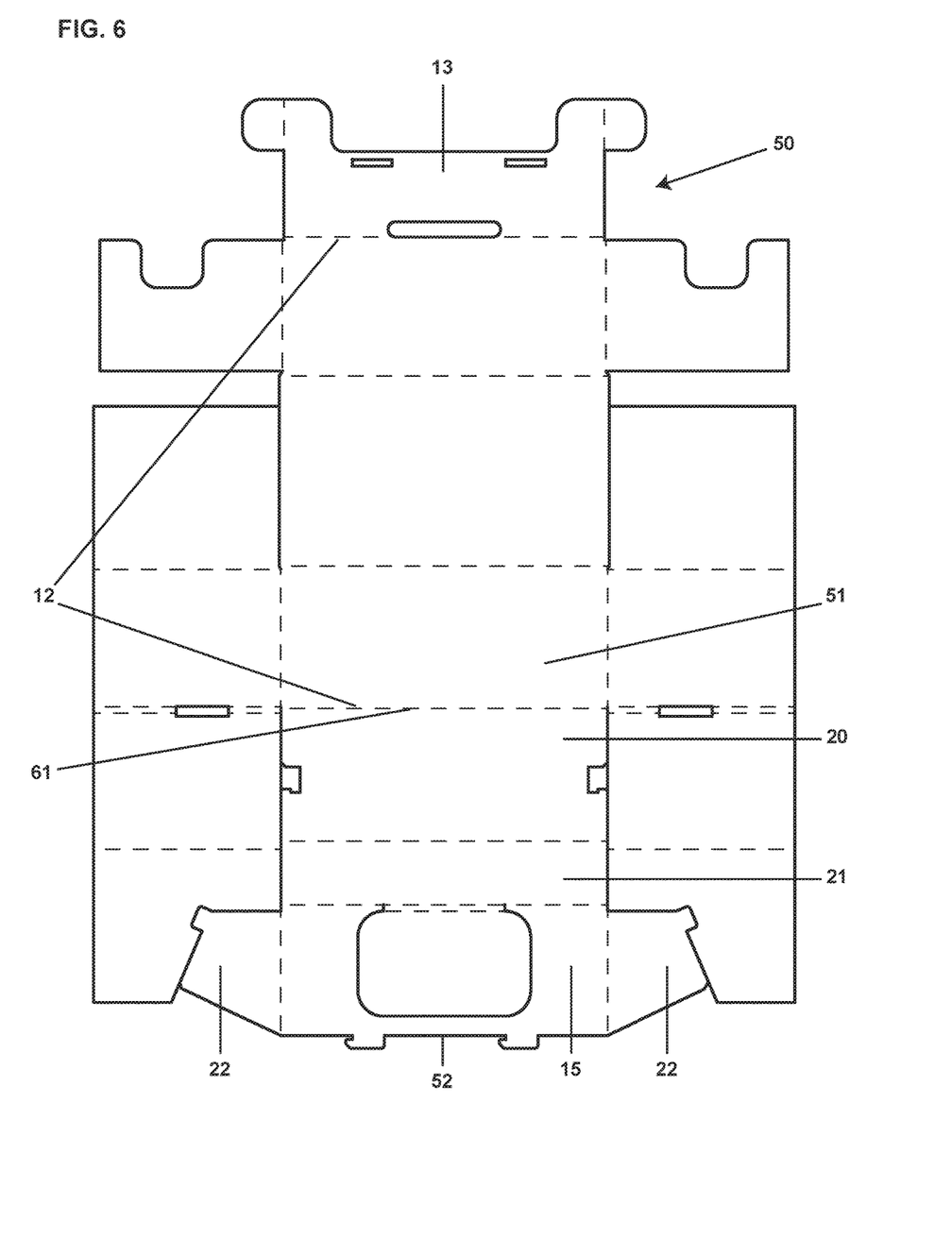
FIG. 6 is a top-down view of an unassembled container formed from one contiguous foldable sheet of substantially rigid material.

The container described above can be formed from one contiguous blank of substantially rigid material, such as corrugated cardboard, as shown in FIG. 6. One of ordinary skill in the art, however, would recognize that any substantially rigid material that is suitable for shipping can be used in accordance with the teachings herein.

In FIG. 6, the solid lines between panels indicate that cuts separate the panels and dotted lines between panels indicate fold lines. As illustrated, the blank 50 has a first plurality of contiguous panels 51 and a second plurality of contiguous panels 52. The first plurality of contiguous panels 51 can be folded to form open-top box portion 11 having an upper edge 12 and a top flap 13. The second plurality of contiguous panels 52 is attached to the first plurality of contiguous panels 51 at upper edge 12 along fold line 61. The second plurality of contiguous panels 52 can be folded to form the lid assembly 14. As described above, the lid assembly 14 has a first configuration suitable for receiving and storing various objects in the open-top box portion 11 and has a second configuration in which the open-top box portion 11 is sealed by the lid assembly 14 and suitable for shipment.

Blank 50 may be produced on a commercial scale according to well-known methods of die cutting. For example, a mechanical press may be configured with a die shaped to cut out blank 50. The mechanical press could then be used to cut out blank 50 from sheets of the desired material passing underneath the mechanical press.

According to another aspect of the disclosure, container 10 can be thermally protected, for example by applying a flame-retardant treatment thereto. In embodiments, the flame-retardant treatment includes a thermally protective lining that is applied to at least a portion of the interior surface of container 10 (that is, the surface of container 10 facing the contents thereof).

For instance, a thermally protective lining can be formed by pelletizing polyethylene terephthalate (PET) (desirably including up to about 50% post-consumer PET), heating the pelletized PET, and extruding it into fibers that can be thermally-formed and needle-punched into sheets. The resulting PET sheets can be die cut to the desired shape and size and applied to the interior of container 10 (e.g., attached via adhesive to relevant surfaces of blank 50).

Such a PET-based thermally protective lining performed well in testing. In a first test, a selection of rechargeable batteries was placed in a container lined with a PET-based thermally protective lining. Thermal runaway was induced in a lithium ion (lithium cobalt oxide) ignitor cell within the container. Although the ignitor cell exploded with flame, the thermal event was contained (e.g., no flames exited the container, which remained intact throughout the thermal runaway event).

In a second test, a selection of rechargeable batteries was placed in a container lined with a PET-based thermally protective lining. Thermal runaway was induced in a lithium primary (lithium manganese dioxide) ignitor cell within the container. Once again, although the ignitor cell exploded with flame, the thermal event was contained (e.g., no flames exited the container, which remained intact throughout the thermal runaway event).

Another suitable material for use as a thermally protective lining is Durapad® polyester, available from Marves Industries of Hildebran, N.C.

As an alternative or in addition to a thermally protective lining, the material of container 10 can be chemically treated with a flame retardant. For instance, a flame-retardant chemical, such as Spectra-Guard® FR-Kote flame retardant coating from Spectra-Kote Corporation of Gettysburg, Pa., can be added to the corrugated slurry during pre-production (e.g., during manufacture of blank 50). As another example, a flame-retardant chemical, such as S320 fire retardant coating from Nochar Inc. of Indianapolis, Ind., can be sprayed on container 10 (e.g., on blank 50).

Although several embodiments are described above with a certain degree of particularity, those skilled in the art could make numerous alterations to the disclosed embodiments without departing from the spirit or scope of this disclosure.

For example, although thermally protected containers having certain physical configurations are described herein, such description is only by way of example and illustration. It is expressly contemplated that the teachings herein regarding thermal protection can be applied to containers having other physical configurations without departing from the scope of the instant disclosure.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A container comprising:
    an open-top box having an upper edge and including a top flap attached to the upper edge along a first fold line; and
    a lid assembly attached to the upper edge of the open-top box along a second fold line and comprising:
        a back panel;
        a front panel attached to the back panel and including an opening; and
        a pair of side flaps attached to at least one of the back panel and the front panel along a pair of fold lines,
    wherein the lid assembly has a first configuration in which the lid assembly is coupled to the top flap such that the opening in the front panel provides access to an interior of the open-top box with the pair of side flaps folded to form a side closure to the lid assembly; and
    wherein the lid assembly has a second configuration in which the pair of side flaps secure the lid assembly to the open-top box such that the container is sealed for shipment, and
    a thermally protective lining, consisting of polyethylene terephthalate, secured to an inner surface of at least a portion of the container.

2. The container of claim 1, wherein the front panel of the lid assembly further comprises a door configured to substantially close the opening.

3. The container of claim 1, wherein the front panel is directly attached to the back panel along a third fold line.

4. The container of claim 1, wherein the lid assembly further comprises a top panel, wherein the front panel is attached to the back panel via the top panel with the top panel being attached the front panel along a third fold line and attached to the back panel along another fourth fold line.

5. The container of claim 1, wherein the pair of side flaps are attached to the front panel of the lid assembly along a pair of fold lines.

6. The container of claim 1, wherein the pair of side flaps are attached to the back panel of the lid assembly along a pair of fold lines.

7. The container of claim 1, wherein the open-top box and lid assembly are formed from one contiguous, foldable sheet of a substantially rigid material.

8. A blank of substantially rigid material comprising:
    a first plurality of contiguous panels joined along a plurality of fold lines and foldable into an open-top box having an upper edge; and
    a second plurality of contiguous panels attached to the first plurality of foldable panels along a lid assembly fold line and including a plurality of fold lines such that the second plurality of contiguous panels is foldable into a lid assembly, the second plurality of contiguous panels comprising:
        a back panel;
        a front panel including an opening; and
        a pair of side flaps adjacent to at least one of the back panel and the front panel and demarcated by a pair of fold lines;
    a thermally protective lining, consisting of polyethylene terephthalate, secured to at least some of the panels of the first plurality of contiguous panels or the second plurality of contiguous panels,
    wherein the lid assembly has a first configuration in which the lid assembly is coupled to the top flap such that the opening in the front panel provides access to an interior of the open-top box with the pair of side flaps folded to form a side closure to the lid assembly; and
    wherein the lid assembly has a second configuration in which the pair of side flaps secure the lid assembly to the open-top box such that the container is sealed for shipment.

9. The blank of claim 8, wherein the front panel of the lid assembly further comprises a door configured to substantially close the opening.

10. The blank of claim 8, wherein the front panel is directly attached to the back panel along a fold line.

11. The blank of claim 8, wherein the lid assembly further comprises a top panel, wherein the front panel is attached to the back panel via the top panel with the top panel being attached the front panel along a fold line and attached to the back panel along another fold line.

12. The blank of claim 8, wherein the pair of side flaps are attached to the front panel of the lid assembly along a pair of fold lines.

13. The blank of claim 8, wherein the pair of side flaps are attached to the back panel of the lid assembly along a pair of fold lines.

* * * * *